United States Patent [19]

Takahashi

[11] Patent Number: 5,708,642
[45] Date of Patent: Jan. 13, 1998

[54] OPTICAL HEAD DEVICE WITH LENS SYSTEM FOR INCREASING BEAM DIAMETER OF LIGHT TO BE INCIDENT ON OBJECTIVE LENS

[75] Inventor: Jun-ichi Takahashi, Tokyo, Japan

[73] Assignee: NEC Corporation, Japan

[21] Appl. No.: 710,846

[22] Filed: Sep. 23, 1996

[30] Foreign Application Priority Data

Sep. 29, 1995 [JP] Japan ................................ 7-252883

[51] Int. Cl.⁶ ........................................................ G11B 7/00
[52] U.S. Cl. ........................ 369/112; 369/109; 369/44.23
[58] Field of Search ............................. 369/112, 111, 369/100, 116, 109, 44.14, 44.38, 44.23, 44.37, 275.3

[56] References Cited

U.S. PATENT DOCUMENTS

| 4,179,708 | 12/1979 | Sheng et al. | 358/128 |
| 5,157,555 | 10/1992 | Reno | 359/823 |
| 5,402,407 | 3/1995 | Eguchi et al. | 369/112 |

FOREIGN PATENT DOCUMENTS

| 0398431 | 11/1990 | European Pat. Off. |
| 0592766 | 4/1994 | European Pat. Off. |
| 57-117137 | 7/1982 | Japan |
| 59-142519 | 8/1984 | Japan |
| 1-290176 | 11/1989 | Japan |
| 4-60923 | 2/1992 | Japan |
| 5-60923 | 3/1993 | Japan |
| 2156139 | 10/1985 | United Kingdom |

OTHER PUBLICATIONS

Author Unknown; "Selective Aperture Illumination for Increased Depth of Focus"; Jun. 1, 1995; p. 109; IBM Technical Disclosure Bulletin, vol. 38, No. 6.

*Primary Examiner*—David C. Nelms
*Assistant Examiner*—Kim-Kwok Chu
*Attorney, Agent, or Firm*—Hayes, Soloway, Hennessey, Grossman & Hage, P.C.

[57] ABSTRACT

An optical head is provided which device has an optical system with which light emitted from a laser source and reflected from a beam splitter is converged onto an optical disk by an objective lens and reflected light is guided to a photo-detector. The optical system includes a beam diameter enlarging lens which enlarges beam diameter of luminous flux incident on the objective lens from the laser source through the beam splitter. The beam diameter enlarging lens may be a conical lens. According to the present invention, it is possible to enlarge the range over which access can be made by the objective lens alone without requiring means such as a lens actuator.

3 Claims, 5 Drawing Sheets

TIME t →

TIME t ⟶

TIME t ⟶

OPTICAL HEAD DEVICE WITH LENS SYSTEM FOR INCREASING BEAM DIAMETER OF LIGHT TO BE INCIDENT ON OBJECTIVE LENS

BACKGROUND OF THE INVENTION

1. Field of the Invention

The present invention relates to an optical head device, and more particularly to an optical head device for writing to and reading from a medium such as an optical disk.

2. Description of the Related Art

Conventionally, in an optical disk device, various types of optical heads, such as a separate type optical head, have been proposed for achieving high speed access. However, in such a high speed access system for a data recording medium, there have been physical limits in access time because of, as compared with a magnetic disk device, relatively heavy weight of the optical head and presence of a lens actuator for controlling focusing and tracking. On the other hand, in the optical disk device, even with respect to the track density alone, the capacity thereof is ten times that of the magnetic disk device so that the amount of movement of the optical head during information retrieval has been reduced to about $1/10$ per data as compared with that in the magnetic disk device. Therefore, in practice, the number of trackings during frequent information retrieval in the majority of cases falls within a narrow range of about 100 tracks so that the amount of movement of the optical head is on the order of $\pm 0.1 - \pm 0.2$ mm.

Conventionally, the accessing operation is carried out using a lens actuator for reading data at a high speed in a range of $\pm 0.1 - \pm 0.2$ mm. The lens actuator has only the objective lens as its moving portion so that it excels in acceleration sensitivity as compared with that of a carriage motor which causes the entire optical head to be moved. However, on the objective lens, the beam from the semiconductor laser for reading data from the optical disk is incident and, in addition, there is provided an optical system for guiding the beam reflected from the optical disk to a photo-detector. For this reason, if the objective lens is caused to make a large movement toward a tracking direction, the optical axis deviates and is unable to guide the reflected light to the photo-detector so that, because of deterioration of reproduction signal and occurrence of off-setting of servo-error signal, the objective lens can move only within a narrow range.

An overall arrangement of a conventional optical head device is now explained with reference to FIG. 1.

Conventional optical head device 50 includes a semiconductor laser 52, a photo-detector 54, and an optical system 60 with which the beam emitted from the semiconductor laser 52 is focused on an optical disk 58 by an objective lens 56, etc. and which guides the reflected light to the photo-detector 54. The lens system 60 includes, in addition to the objective lens 56, a diffraction grating 62 and a beam splitter 64.

The beam emitted from the semiconductor laser 52 is transmitted through the diffraction grating 62 whereby three beams for detecting tracking error signals are generated and, after being reflected from the beam splitter 64, they are received by the objective lens 56. The three beams consist of a 0-order beam (main beam) for recording/reproduction and $\pm 1$-order beams (sub-beams) for tracking. The reflected beam from the signal surface of the optical disk 58 is incident on the light receiving surface of the photo-detector 54 through the objective lens 56 and the beam splitter 64, whereby the beam is converted into electrical signals.

Now, focusing error signal detection for controlling a minute spot by following surface position instability of the optical disk 58 is explained. The beam reflected from the optical disk 58 generates astigmatism when it is again incident on the objective lens 56 and passes through the beam splitter 64. The light having thus passed through the beam splitter 64 is caused to be incident on the photo-detector 54 whereby the focusing error signal detection is carried out. This is a conventional astigmatism method.

Tracking error signal detection by following eccentricity of the optical disk 58 is now explained. The three beams generated by the diffraction grating 62 mentioned above are irradiated on the optical disk 58 and, by setting the rotating position of the diffraction grating 62 such that the $\pm 1$-order beams are positioned respectively at two sides of the tracking pit, tracking error can be detected from differences between the $\pm 1$-order beams.

Each of FIGS. 2 and 4 shows a portion of the structure that is located in the vicinity of the objective lens 56 in the conventional optical head device 50. FIG. 3 is a wave-form diagram showing tracking error signal when the objective lens is in the state shown in FIG. 2, and FIG. 5 is a wave-form diagram showing tracking error signal when the objective lens is in the state shown in FIG. 4. This prior art is explained with reference to FIGS. 1 to 5.

FIG. 2 shows a situation wherein the central axis "b" of the objective lens 56 is coincident with the central axis "a" of the luminous flux A that is incident on the objective lens 56 from the side of the semiconductor laser 52. In this situation, as shown in FIG. 3, the tracking error signal can be detected with no problem.

FIG. 4 shows a situation wherein, as a result of the movement of the objective lens 56 towards the tracking direction, the central axis "b" of the objective lens 56 is deviated a large amount from the central axis "a" of the luminous flux A. In this case, since a large portion of the luminous flux A is not incident on the objective lens 56, the tracking error signal exhibits a reduced signal amplitude, as can be seen in FIG. 5, and causes off-set to occur. When off-set occurs in the tracking error signal, the track servo becomes unstable whereby reproduction characteristics deteriorate gradually leading to incapability of reproduction.

Therefore, in the conventional optical device, if the objective lens is moved a large extent in the tracking direction, the optical axis deviates and, as a result, the reflected light cannot be guided to the photo-detector so that deterioration of reproduction of signals and off-setting of servo error signals occur. For this reason, since the objective lens can only be moved within a narrow amount, it is not possible to achieve high speed access.

Also, as conventional high speed access systems, there have been proposed, for example, a system in which seek operation is divided into one by coarse actuator and one by fine actuator (as disclosed in Japanese Patent Application Kokai Publication No. Hei 1-290176), and a two-stage servo system in which the carriage itself performs a seek operation while holding the objective lens in a neutral position (as disclosed in Japanese Patent Application Kokai Publication Nos. Hei 5-60923 and No. Hei 4-60923).

However, in the conventional high seed access systems described above, the extent of the movement of the objective lens is the same as that in other conventional systems so that there are limits in the access time because of the weight of the optical device, and this in turn becomes a reason for necessitating size increase of the carriage motor.

SUMMARY OF THE INVENTION

An object of the present invention is to overcome the problems existing in the prior art, and to provide an optical head device with which, in an optical disk data reproduction system arranged for reading data by detecting modulated signals recorded on the recording surface of the optical disk, it is able to permit high speed access to the recorded data on the optical disk.

According to one aspect of the invention, there is provided an optical head device having an optical system by which light emitted from a laser source and reflected from a beam splitter is converged onto an optical disk by an objective lens and reflected light is guided to a photo-detector, the optical head device including:

a beam diameter enlarging lens which is disposed within the optical system and which enlarges beam diameter of flux incident on the objective lens from the laser source through the beam splitter.

In a preferred embodiment, the beam diameter enlarging lens is constituted by a conical lens.

The optical head device according to the invention is arranged such that, in the optical system in which the light reflected from the laser source is converged into a minute spot, and the reflected light from this converged point is guided to the photo-detector, the reflected light can be guided to the photo-detector without causing deviation of the optical axis even if the objective lens is moved a large amount in the tracking direction. Therefore, access is possible over a wide range of movement in the tracking direction without causing deterioration of reproduction signals or off-setting of servo error signals. Thus, since the range over which access can be made using the objective lens alone can be enlarged, the optical disk device according to the invention can achieve a significantly higher access speed as compared with that of the prior art devices.

BRIEF DESCRIPTION OF THE DRAWINGS

The above and other objects, features and advantages of the present invention will be apparent from the following description of a preferred embodiment of the invention explained with reference to the accompanying drawings, in which.

DETAILED DESCRIPTION OF PREFERRED EMBODIMENT OF THE INVENTION

Now, one preferred embodiment of the invention is explained with reference to the drawings.

Figure 1:
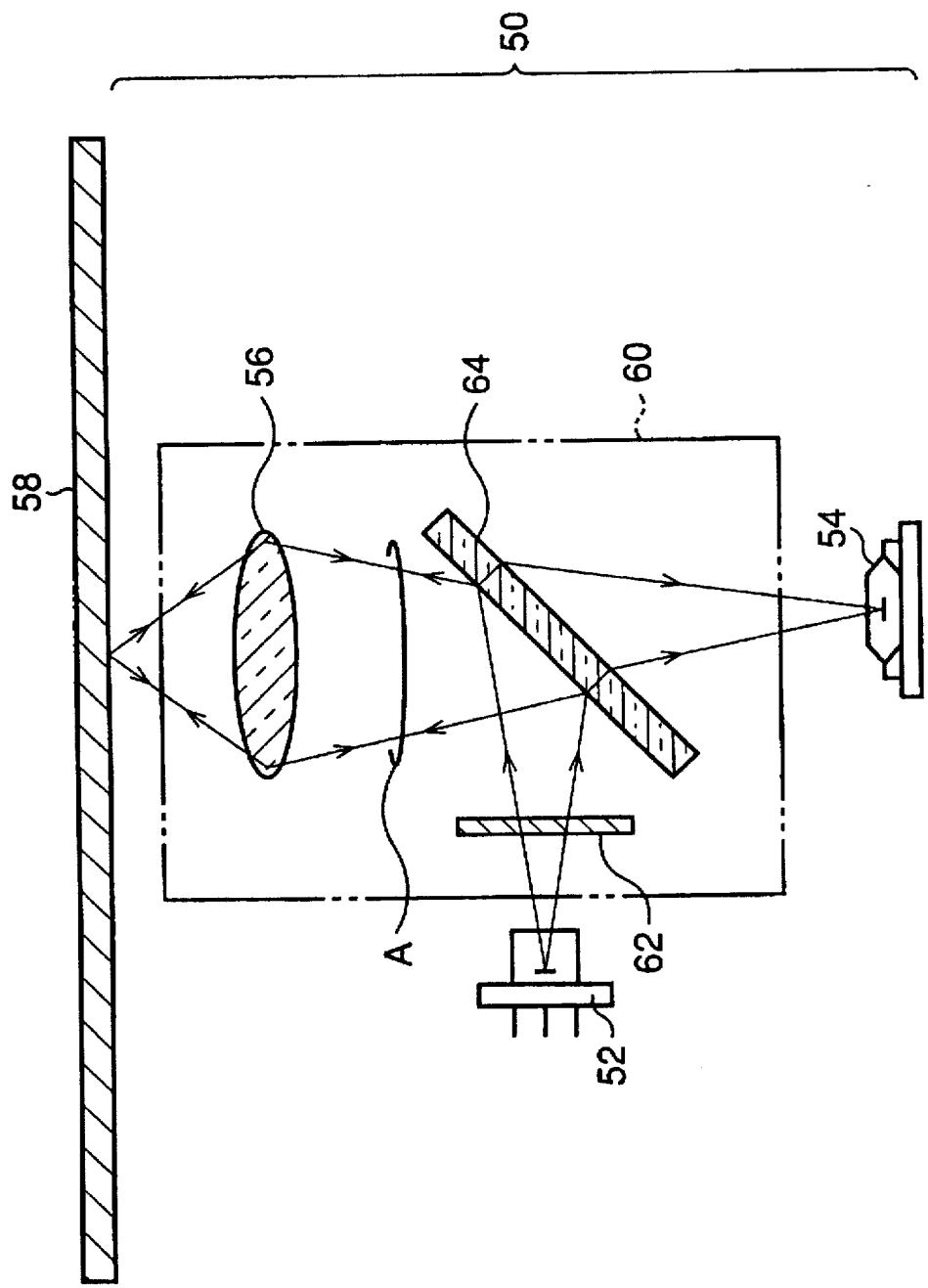
FIG. 1 is a diagram showing an overall arrangement of a conventional optical head device.
Figure 2:
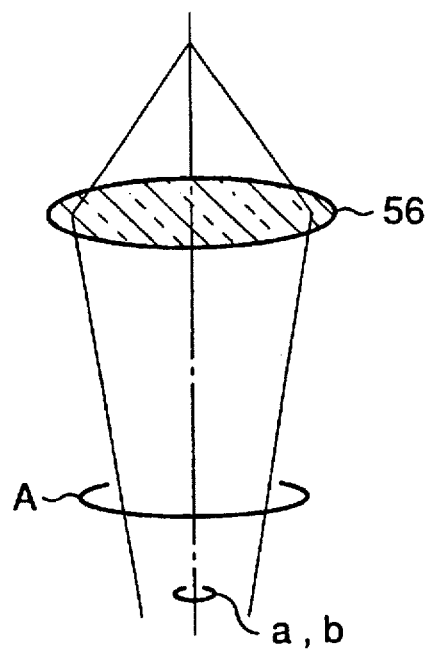
FIG. 2 is a diagram showing a portion of the structure that is located in the vicinity of an objective lens in the conventional optical device shown in FIG. 1.
Figure 3:
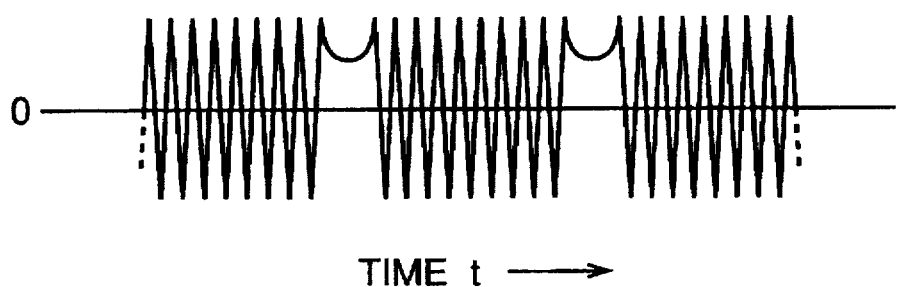
FIG. 3 is a wave-form diagram showing tracking error signals when the objective lens is in the state shown in FIG. 2.
Figure 4:
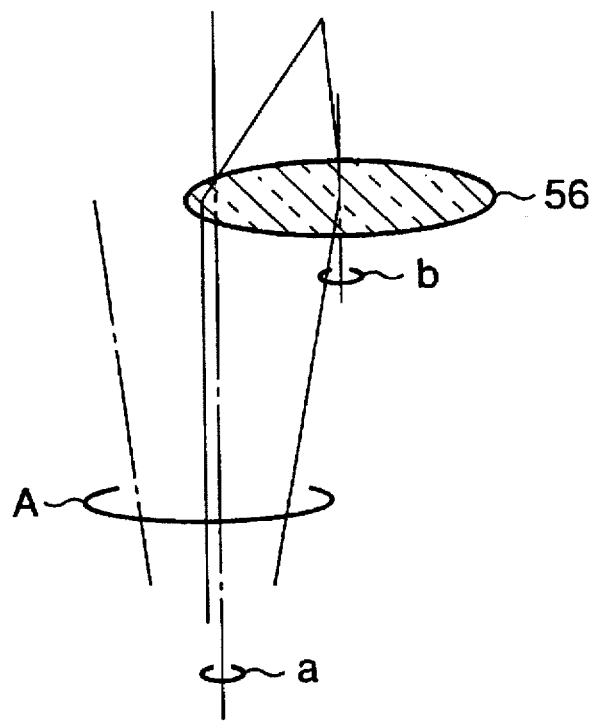
FIG. 4 is a diagram showing a portion of the structure that is located in the vicinity of an objective lens in the conventional optical device shown in FIG. 1.
Figure 5:
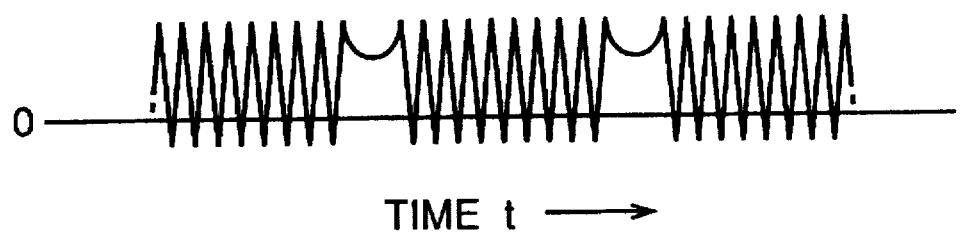
FIG. 5 is a wave-form diagram showing tracking error signals when the objective lens is in the state shown in FIG. 4.
Figure 6:
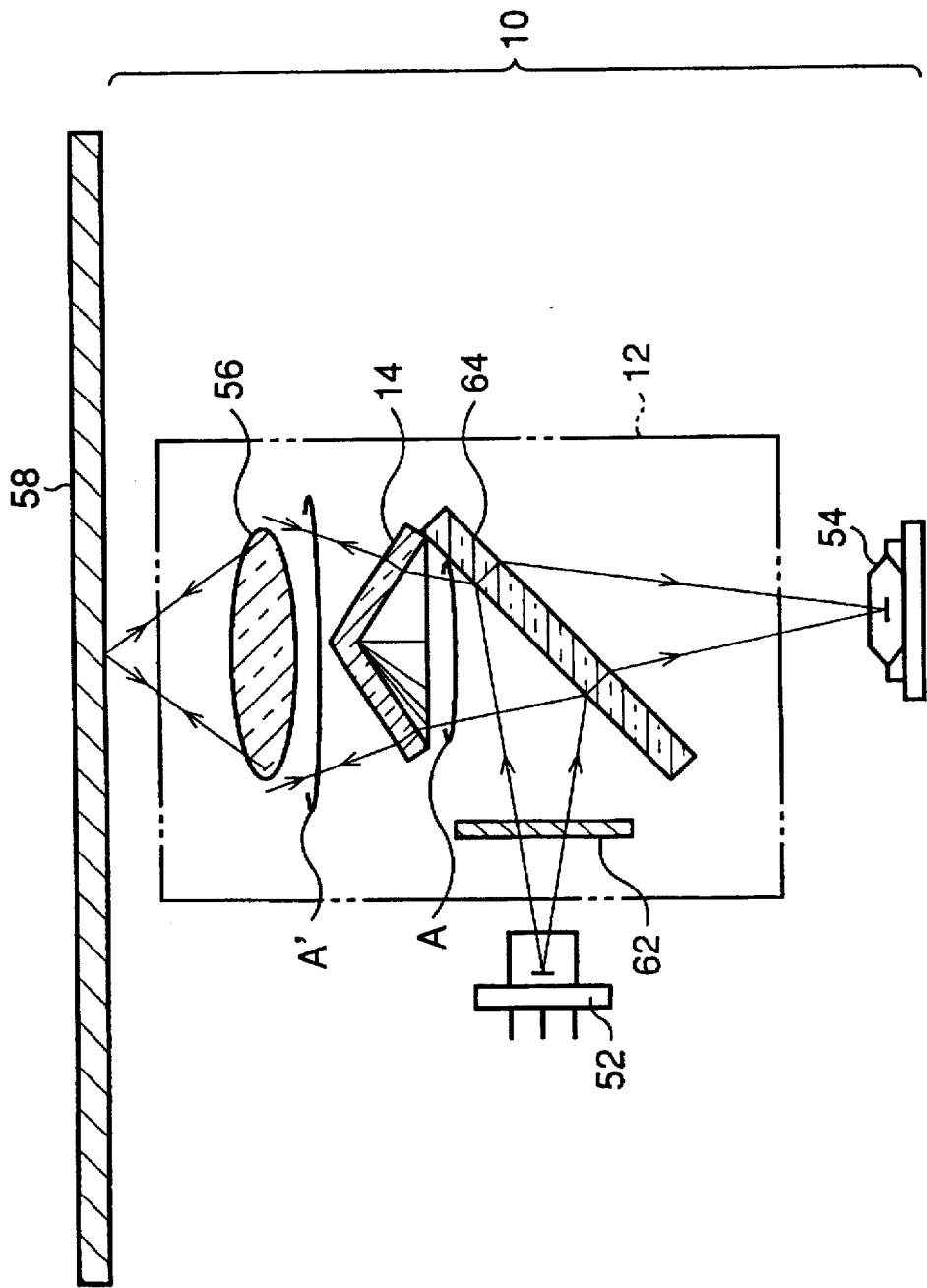
FIG. 6 is a diagram showing an overall arrangement of an optical head device of one embodiment according to the invention.

FIG. 6 shows an overall structure of an optical head device of one embodiment according to the invention. In FIG. 6, the same or like elements as in FIG. 1 are given the same or like reference numerals and explanation therefore are omitted.

The optical head device 10 according to the invention includes a semiconductor laser 52 as a laser source, a photo-detector 54, and an optical system 12 which converges the reflected light from the semiconductor laser 52 onto an optical disk 58 by an objective lens 56, etc. One of the features is that the optical system 12 includes a conical lens 14. The conical lens 14 functions as a beam diameter enlarging lens which enlarges the diameter of the luminous flux A that is incident on the objective lens 56 from the side of the semiconductor laser 52. As the beam diameter enlarging lens, a concave lens may be used.

The light irradiated from the semiconductor laser 52 passes through a diffraction grating 62 for generating a tracking error signal, changes its light path at a beam splitter 64 and, after passing through the conical lens 14, is incident on the objective lens 56. When the luminous flux A passes through the conical lens 14, its diameter decreases and the luminous flux A becomes a luminous flux A'. When the luminous flux A' is incident on the objective lens 56, it is converged as a minute spot and irradiates the optical disk 58. The light that irradiates the optical disk 58 reflects the data on the optical disk 58 and, after being incident again on the objective lens 56, proceeds through a reverse optical path. After the light is transmitted through the objective lens 56, its beam diameter is reduced, and the light is incident on the conical lens 14 and, when the light passes through the beam splitter, its beam diameter is reduced and astigmatism occurs, whereby focus error signals are generated and led to the photo-detector 54.

Since the range over which the luminous flux A' can be incident on the objective lens 56 is enlarged, it is possible to enlarge the range of access when the objective lens is moved in the tracking direction.

Figure 7:
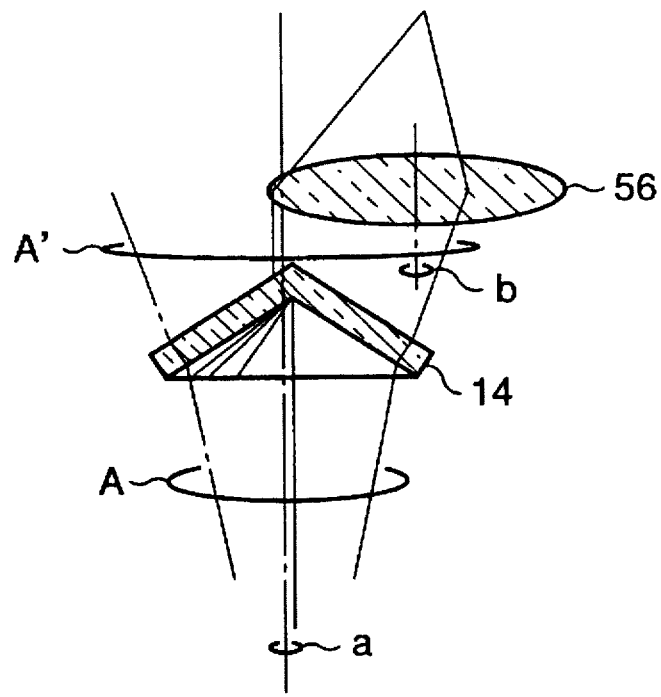
FIG. 7 is a diagram showing a portion of the structure that is located in the vicinity of an objective lens in the optical device of the embodiment shown in FIG. 6.
Figure 8:
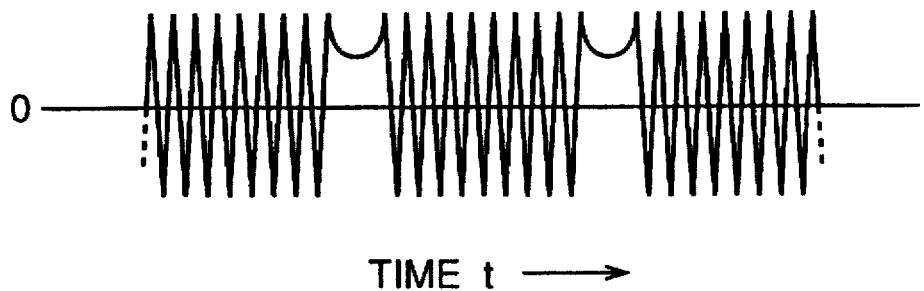
FIG. 8 is a wave-form diagram showing tracking error signals when the objective lens is in the state shown in FIG. 7.

FIG. 7 shows a portion of the structure in the vicinity of the objective lens in the optical head device shown in FIG. 6. FIG. 8 is a wave-form diagram showing tracking error signals when the objective lens is in the state shown in FIG. 7. FIGS. 6 to 8 are referred to in the following explanation.

The beam diameter of the luminous flux A incident on the objective lens 56 is enlarged by the conical lens 14 so that, when the objective lens 56 is moved in the tracking direction, the range over which off-set does not occur in the tracking error signal can be enlarged.

In the high speed access system in the optical disk device according to the invention, by enlarging the range over which the objective lens can move in the tracking direction, it becomes possible to attain high speed access in a narrow recording range. Therefore, irrespective of the problems of needing a large size head feeding mechanism and accompanying increase in cost, which have been attempted to be solved in prior art optical disk devices, the present invention permits provision of an improved access system which is of low cost, compact and is excellent in acceleration sensitivity. This is because, by using a beam diameter enlarging lens such as a conical lens, it becomes possible to enlarge the range over which access can be made by the objective lens alone without requiring means such as a lens actuator.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. An optical head device comprising an optical system for converging onto an optical disk by an objective lens light emitted from a laser source and reflected from a beam splitter and for guiding the light reflected to a photo-detector, said optical head device also comprising:

a beam diameter enlarging lens which is disposed between said objective lens and said beam splitter within said optical system and which is for enlarging a beam diameter of a flux incident on said objective lens from said laser source through said beam splitter.

2. An optical head device according to claim 1, in which said beam diameter enlarging lens comprises a conical lens.

3. An optical head device according to claim 1, in which said beam diameter enlarging lens is adapted to enlarge said beam diameter over an entire movement range of said objective lens in a tracking direction.

* * * * *